(12) United States Patent
Mancl et al.

(10) Patent No.: US 7,518,274 B1
(45) Date of Patent: Apr. 14, 2009

(54) MOTOR BRACKET WITH INTEGRAL TERMINALS

(76) Inventors: Dennis J. Mancl, 284 Essex Dr., Bluff City, TN (US) 37618; Leonard J. Lavasser, 387 Carlton Rd., Bristol, TN (US) 37620

( * ) Notice: Subject to any disclaimer, the term of this patent is extended or adjusted under 35 U.S.C. 154(b) by 452 days.

(21) Appl. No.: 11/451,203

(22) Filed: Jun. 12, 2006

(51) Int. Cl.
*H02K 5/14* (2006.01)
*H02K 5/22* (2006.01)
*H02K 23/66* (2006.01)

(52) U.S. Cl. .................. 310/71; 310/242; 310/249
(58) Field of Classification Search .................. 310/43, 310/71, 239, 242, 249; 427/116–120
See application file for complete search history.

(56) References Cited

U.S. PATENT DOCUMENTS

| | | | |
|---|---|---|---|
| 599,781 A | 3/1898 | Gutmann | |
| 2,188,809 A | 1/1940 | Dow | |
| 2,914,689 A | 11/1959 | Weeks | |
| 3,654,504 A * | 4/1972 | Susdorf et al. | 310/239 |
| 3,979,615 A | 9/1976 | Neff | |
| 4,038,573 A | 7/1977 | Hillyer | |
| 4,059,776 A | 11/1977 | Schreiber | |
| 4,132,460 A | 1/1979 | Porta | |
| 4,157,483 A | 6/1979 | Frimley | |
| 4,163,167 A | 7/1979 | Zelt | |
| 4,177,397 A | 12/1979 | Lill | |
| 4,181,393 A | 1/1980 | Lill | |
| 4,190,781 A | 2/1980 | Sauerwein | |
| 4,250,613 A | 2/1981 | Sauerwein | |
| 4,266,843 A | 5/1981 | Marsh | |
| 4,322,647 A | 3/1982 | Neroda | |
| 4,442,370 A | 4/1984 | Veyssiere | |
| 4,469,967 A | 9/1984 | Grierson | |
| 4,481,435 A | 11/1984 | Loforese | |
| 4,494,026 A | 1/1985 | Abe | |
| 4,498,230 A | 2/1985 | Harris | |
| 4,513,214 A * | 4/1985 | Dieringer | 310/71 |
| 4,523,116 A * | 6/1985 | Dibbern et al. | 310/71 |
| 4,539,500 A | 9/1985 | Houben | |
| 4,550,268 A | 10/1985 | Becker | |
| 4,593,220 A * | 6/1986 | Cousins et al. | 310/239 |
| 4,613,781 A | 9/1986 | Sanders | |
| 4,617,486 A | 10/1986 | Miyauchi | |
| 4,621,991 A | 11/1986 | Smith | |
| 4,642,885 A | 2/1987 | King | |
| 4,656,378 A | 4/1987 | Atherton | |
| 4,673,837 A | 6/1987 | Gingerich | |
| 4,677,329 A | 6/1987 | Secoura | |
| 4,689,023 A | 8/1987 | Strong, III | |
| 4,698,534 A | 10/1987 | Smith | |
| 4,707,627 A | 11/1987 | Best | |
| 4,749,365 A | 6/1988 | Magnifico | |
| 4,774,430 A | 9/1988 | Rodriguez | |
| 4,782,261 A | 11/1988 | Crevling, Jr. | |
| 4,801,833 A | 1/1989 | Dye | |

(Continued)

*Primary Examiner*—Tran N Nguyen
(74) *Attorney, Agent, or Firm*—www.Bobharter.com; Robert J. Harter

(57) ABSTRACT

A universal motor comprises a stator interposed between a housing and a novel plastic bracket. The plastic bracket is a unitary piece that not only defines a plurality of terminal receptacles but also supports the motor's outboard bearing. In some embodiments, the plastic bracket also includes an integral post for supporting a spring that urges a carbon brush against the motor's commutator.

2 Claims, 3 Drawing Sheets

U.S. PATENT DOCUMENTS

| | | |
|---|---|---|
| 4,868,441 A | 9/1989 | Bulick |
| 4,880,391 A | 11/1989 | Hurtgen |
| 4,937,482 A | 6/1990 | Dohogne |
| 5,004,943 A | 4/1991 | Gagneux |
| 5,013,952 A | 5/1991 | Sekine |
| 5,015,894 A | 5/1991 | Crow |
| 5,039,898 A | 8/1991 | Shiina |
| 5,055,728 A | 10/1991 | Looper |
| 5,159,221 A | 10/1992 | Miyazaki |
| 5,175,458 A | 12/1992 | Lemmer |
| 5,184,041 A | 2/1993 | Baer |
| 5,331,240 A | 7/1994 | Hyodo |
| 5,465,016 A * | 11/1995 | Mancl et al. .................. 310/71 |
| 5,717,271 A * | 2/1998 | Aoki et al. .................. 310/242 |
| 6,106,324 A | 8/2000 | Kwapien |
| 6,300,698 B1 | 10/2001 | Fargo |

\* cited by examiner

MOTOR BRACKET WITH INTEGRAL TERMINALS

BACKGROUND OF THE INVENTION

1. Field of the Invention

The subject invention generally pertains to series-wound universal motors and more specifically to the electrical terminals of such a motor.

2. Description of Related Art

The universal motor is a single-phase commutated motor with wound field coils in series with a wound rotor armature. Due to their high power-to-weight ratio, universal motors are particularly useful for powering handheld tools and various small household appliances such as vacuum cleaners. Since handheld tools and small appliances are often portable, they may be subject to jarring, vibration and mechanical shock, thus their motors should be designed to withstand such handling. Moreover, small tools and appliances are often mass-produced, so their motors need to be quick and easy to assemble.

The current inventor, Dennis Mancl, discloses a good example of a mass-produced universal motor in U.S. Pat. No. 5,465,016; which is specifically incorporated by reference herein. The patented motor includes several motor terminal assemblies that serve the purpose of wiring the shunts, which extend from the commutator brushes.

A drawback of the patented design, however, is that each terminal assembly for the shunts includes at least two parts, a nylon terminal pocket and a SIAMEZE terminal (SIAMEZE is a trademark of Tyco Electronics Corporation of Bermuda with an Tyco Electronics business segment in Harrisburg, Pa.), and these terminal assemblies are actually subassemblies, which in turn are attached to the motor in some manner, thereby creating yet another assembly. The multiple parts and assemblies can increase the motor's cost and perhaps decrease its ability to withstand shock and vibration.

Moreover, the SIMAMEZE terminals disclosed in the '016 patent by Mancl are used for wiring shunts, which are stranded wires. Since stranded wire is typically comprised of relatively delicate strands, wire-pinching SIMAMEZE terminals can possibly damage such strands, thus SIMAMEZE terminals are arguably more suited for solid wires than for the stranded shunts of commutator brushes.

Consequently, a need exists for a robust universal motor that is quick and easy to assemble.

SUMMARY OF THE INVENTION

It is an object of the invention to provide a universal motor with reliable electrical terminals that are quick and easy to assemble.

Another object of some embodiments is to minimize the number of parts that make up a universal motor.

Another object of some embodiments is to electrically couple a stranded wire shunt to a SIAMEZE terminal without damaging the shunt's wire strands.

Another object of some embodiments is to provide a universal motor with wire connections that offer the advantages of both SIAMEZE terminals and more conventional male/female connectors.

Another object of some embodiments is to avoid the use of threaded fasteners for wiring a motor.

One or more of these and/or other objects of the invention are provided by a universal motor that comprises a stator, a rotor, a housing and a plastic bracket. The plastic bracket is a unitary piece that not only defines a plurality of terminal receptacles but also supports a rotor bearing. In some embodiments, the plastic bracket also includes an integral post for supporting a spring that urges a motor brush against the motor's commutator.

DESCRIPTION OF THE PREFERRED EMBODIMENT

Figure 1:
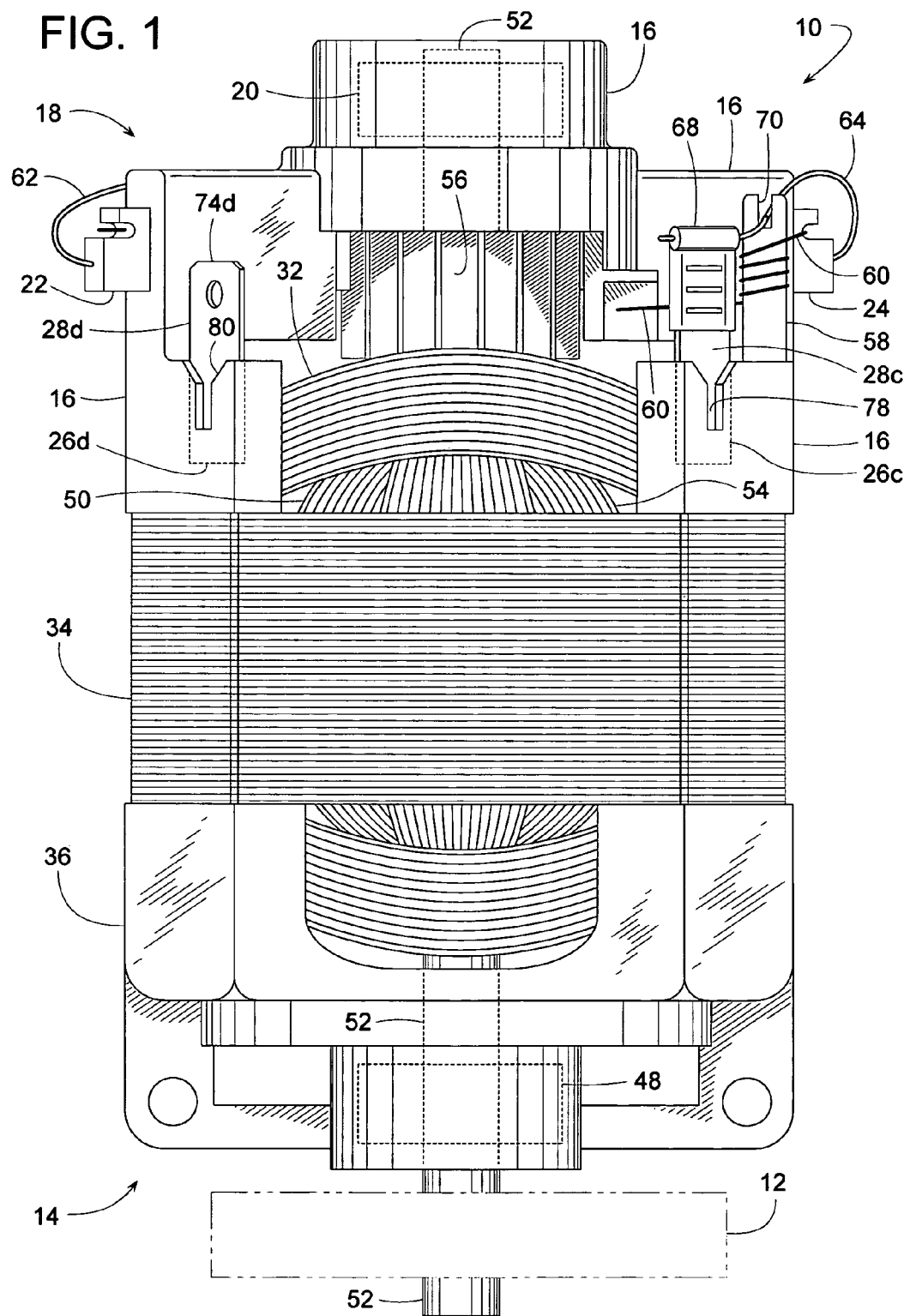
FIG. 1 is a front view a universal motor with a novel bracket.
Figure 2:
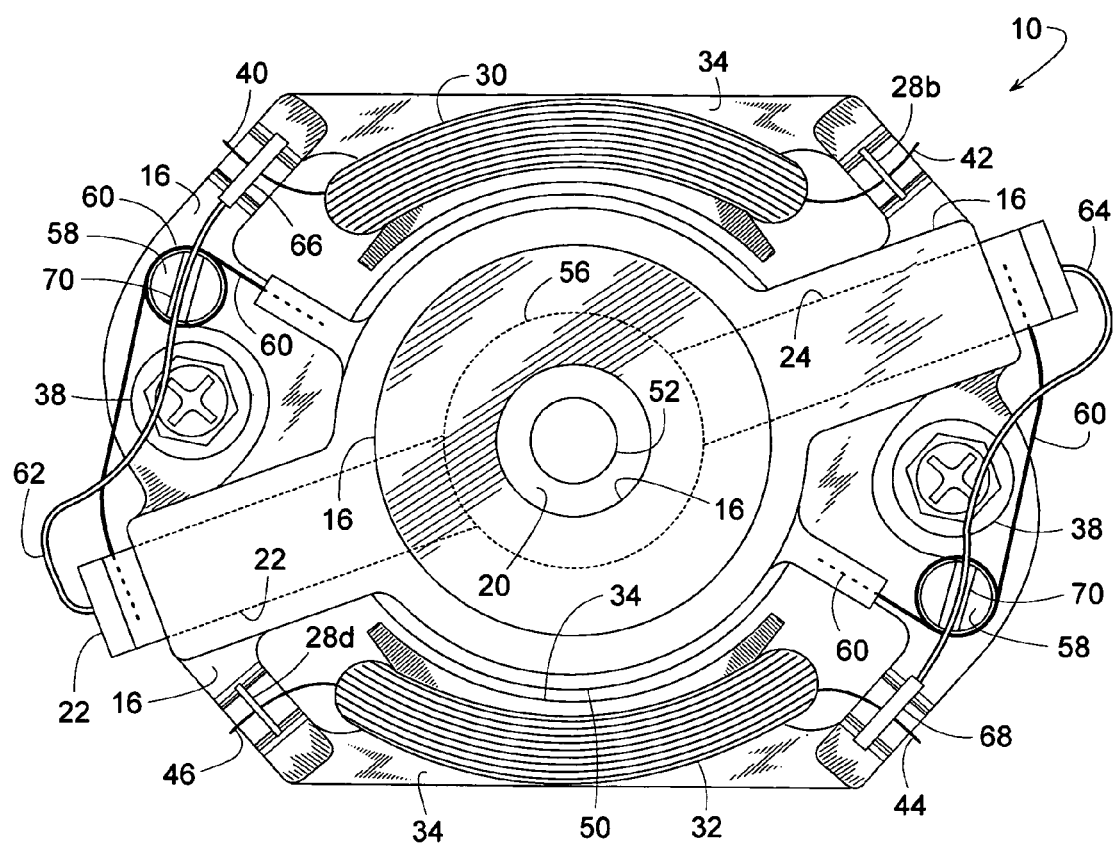
FIG. 2 is a top view of FIG. 1.
Figure 3:
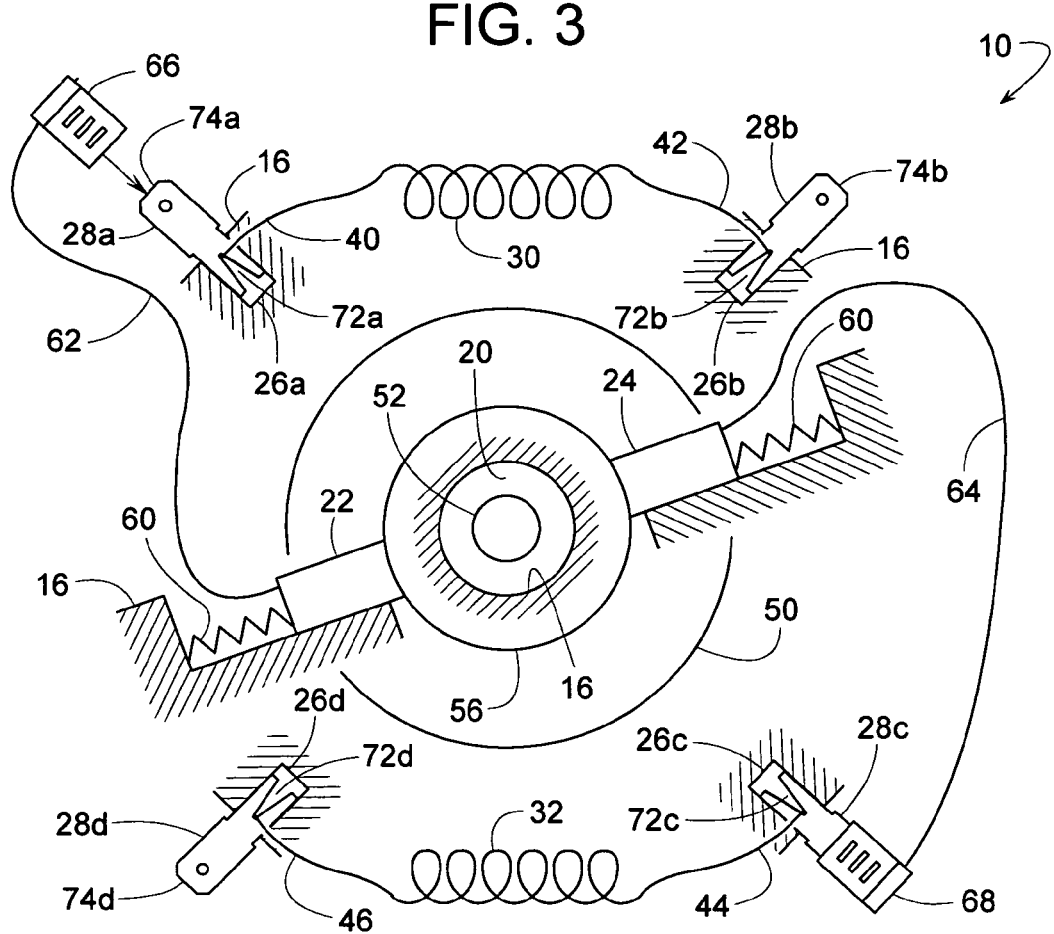
FIG. 3 is a schematic diagram of the motor of FIGS. 1 and 2.
Figure 4:
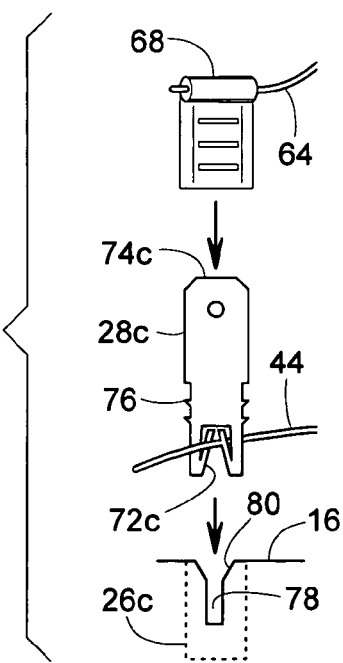
FIG. 4 is an exploded view of a motor terminal connection being assembled.

Referring to FIGS. 1-4, a universal motor 10 for spinning a driven member 12 (e.g., impeller, fan wheel, etc.) at the motor's inboard end 14 includes a novel plastic bracket 16 at the motor's outboard end 18. Bracket 16 is a unitary piece that supports an outboard bearing 20, supports two commutator brushes 22 and 24, and includes four integral receptacles 26*a-d* for receiving four electrically conductive split daggers 28*a-d* such as, for example, SIAMEZE terminals. Daggers 28*a-d* serve as convenient electrical terminals for connecting the wires that lead to brushes 22 and 24, a first field winding 30, a second field winding 32, and the motor's source of AC or DC electrical power.

Although the motor's overall design may vary, in a currently preferred embodiment, motor 10 comprises a laminated stator core 34 interposed between an inboard housing 36 and plastic bracket 16. Screws 38 hold the assembly together. First field winding 30 and second field winding 32 are in position to induce a magnetic field in stator core 34. First field winding 30 is a coil of wire terminating at a wire lead 40 (wire lead 1*a*) and a wire lead 42 (wire lead 1*b*). Second field winding 32, likewise, is a coil of wire terminating at a wire lead 44 (a wire lead 2*a*) and a wire lead 46 (wire lead 2*b*). An inboard bearing 48 is supported by housing 36, and outboard bearing 20 is supported by plastic bracket 16. Bearings 20 and 48 support a shaft 52 of a rotor 50, which in turn supports a rotor winding 54 and its commutator 56.

Carbon brushes 22 and 24 are supported by bracket 16 and are guided against commutator 56. Bracket 16 also includes two integral posts 58 for supporting two coil springs 60 that urge brushes 22 and 24 against commutator 56. To convey electrical current to commutator 56 and thus to armature windings 54, flexible stranded wire shunts 62 and 64 extend from brushes 22 and 24 and terminate at conventional female connectors 66 and 68 or some other suitable type of electrical connector. A slot 70 in each post 58 can be used to help support shuts 62 and 64.

To facilitate the wiring of motor 10, each split dagger 28*a-d* has a corresponding wire-receiving crevice 72*a-d*. In some embodiments, motor 10 is wired by inserting the field wire leads 40, 42, 44 and 46 into crevices 72*a*, 72*b*, 72*c* and 72*d* respectively. Upon inserting daggers 28*a-d* into receptacles 26*a-d*, the field wire leads become tightly pinched within the dagger's crevices, which places the field wires in tight electrical contact with the daggers.

To further facilitate the wiring of motor 10, the exposed ends of daggers 28*a-d* can provide male connectors 74*a-d* or some other suitable means for wiring the motor's field windings and brushes. In some cases, for instance, shunts 62 and 64 of brushes 22 and 24 are electrically coupled to wire leads 40 and 44 by connecting female connectors 66 and 68 to male connectors 74a and 74c. This leaves male connectors 74b and 74d exposed and available for connection to a source of electrical power using conventional female connectors similar to connectors 66 and 68.

Barbs 76 on daggers 28a-d and an interference fit between the daggers and their corresponding receptacles help hold the daggers firmly in place without the need for threaded fasteners that usually take more time to install. Receptacles 26a-d can be provided with a slot 78 and a lead-in 80 that allows the daggers to be inserted in the receptacles without damaging the wire leads of the field windings.

Although the invention is described with reference to a preferred embodiment, it should be appreciated by those skilled in the art that various modifications are well within the scope of the invention. Therefore, the scope of the invention is to be determined by reference to the following claims.

The invention claimed is:

1. A motor for turning a driven member at an inboard end of the motor, the motor comprising:
    a housing at the inboard end of the motor;
    a plastic bracket at an outboard end of the motor;
    a stator core interposed between the housing and the plastic bracket;
    a first field winding and a second field winding in proximity with the stator core to induce a magnetic field therein;
    a wire lead 1a and a wire lead 1b extending from the first field winding;
    a wire lead 2a and a wire lead 2b extending from the second field winding;
    an inboard bearing supported by the housing;
    an outboard bearing supported by the plastic bracket;
    a rotor supported by the inboard bearing and the outboard bearing;
    a rotor winding supported by the rotor;
    a commutator supported by the rotor;
    a first brush supported by the plastic bracket and biased against the commutator;
    a first brush shunt extending from the first brush and terminating at a first female connector;
    a second brush supported by the plastic bracket and biased against the commutator;
    a second brush shunt extending from the second brush and terminating at a second female connector;
    four receptacles including a first receptacle, a second receptacle, a third receptacle and a fourth receptacle, wherein the four receptacles and the plastic bracket comprise an undivided unitary piece;
    a first split dagger disposed within the first receptacle and defining a first crevice;
    a second split dagger disposed within the second receptacle and defining a second crevice;
    a third split dagger disposed within the third receptacle and defining a third crevice;
    a fourth split dagger disposed within the fourth receptacle and defining a fourth crevice;
    a first male connector extending from the first split dagger and engaging the first female connector;
    a second male connector extending from the second split dagger;
    a third male connector extending from the third split dagger and engaging the second female connector; and
    a fourth male connector extending from the fourth split dagger, wherein the following is true:
    a) the wire lead 1a is pinched within the first crevice,
    b) the wire lead 1b is pinched within the second crevice,
    c) the wire lead 2a is pinched within the third crevice,
    d) the wire lead 2b is pinched within the fourth crevice
    e) the first female connector is attached to the first split dagger but is spaced apart from the first crevice, and
    f) the second female connector is attached to the second split dagger but is spaced apart from the second crevice.

2. The motor of claim 1, further comprising:
    a first post integrally extending from the plastic bracket;
    a second post integrally extending from the plastic bracket such that the first post, the second post, the four receptacles and the plastic bracket comprise the unitary piece;
    a first spring supported by the first post and engaging the first brush such that the first spring urges the first brush against the commutator; and
    a second spring supported by the second post and engaging the second brush such that the second spring urges the second brush against the commutator.

* * * * *